United States Patent Office
3,637,836
Patented Jan. 25, 1972

1

3,637,836
CHLORO-PHOSPHNE-m-CARBORANE AND A METHOD OF MAKING THEM
Roy P. Alexander, Killingworth, and Hansjuergen A. Schroeder, Hamden, Conn., assignors to Olin Mathieson Chemical Corporation
No Drawing. Original application Feb. 25, 1966, Ser. No. 529,944, now Patent No. 3,444,272, dated May 13, 1969. Divided and this application July 31, 1968, Ser. No. 761,381
Int. Cl. C07f 9/52
U.S. Cl. 260—543 P                    10 Claims

ABSTRACT OF THE DISCLOSURE

Chlorophosphine-m-carboranes are prepared by reacting di(alkali-metal)-m-carboranes with chlorophosphines. These compounds are useful as flame retardants in plastics and coated paper.

---

This invention relates to novel chlorine-terminated m-carborane compositions prepared by reacting a m-carborane compound with chlorine-substituted phosphines. A further extension of this invention relates to the preparation of alkoxy derivatives of the chlorine-terminated m-carborane compounds.

This application is a division of co-pending application Ser. No. 529,944, filed Feb. 25, 1966, by Roy P. Alexander and Hansjuergen A. Schroeder now U.S. Pat. 3,444,272.

The chlorine-terminated m-carborane compounds of this invention have the formula:

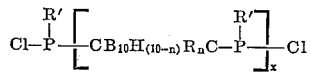

wherein $x$ is an integer of from 1 to about 10, $n$ is an integer of from 0 to 10 inclusive, R is selected from the group consisting of alkyl of from 1 to 5 carbon atoms and halogen selected from the group consisting of chlorine, bromine, iodine and fluorine, R' is selected from the group consisting of chlorine, phenyl, and alkyl-substituted phenyl of not more than 10 carbon atoms, and with the proviso that when R is alkyl, then $n$ is 1.

The novel compounds of this invention are prepared by reacting a di(alkali metal)-m-carborane with a phosphine compound of the formula:

$$R'-PCl_2$$

wherein R' is chlorine, phenyl or alkyl-substituted phenyl of not more than 10 carbon atoms, at a temperature of from about $-10°$ to about $+60°$ C. and preferably from about $0°$ to about $35°$ C. The reaction can be conveniently conducted by adding a slurry of a dilithio-m-carborane in an inert organic solvent to a solution of the phosphine compound in an inert organic solvent. Mixtures of the di(alkali metal)-m-carboranes as well as mixtures of phosphines can be employed if desired.

Useful inert organic solvents include hydrocarbons such as benzene, toluene, xylene, cyclohexane; lower-dialkyl ethers, such as diethyl ether, ethyl propyl ether, di-isopropyl ether, di-n-butyl ether, etc. Generally, from about 0.5 to about 10 moles or more of the said phosphorus compound will be reacted with each mole of the di(alkali metal)-m-carborane employed although it is preferred to utilize from about 1 to about 5 moles of phosphorus trichloride per mole of the starting di(alkali metal)-m-carborane.

Recovery of the products prepared by the reaction of di(alkali metal)-m-carboranes with the phosphine compound can be accomplished by a variety of methods known in the art. For example, at the conclusion of the reaction, the solvent can be removed from the reaction mixture by evaporation in vacuo or by any other convenient method, yielding a residual oil. Monomeric materials of the formula:

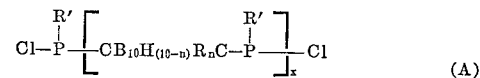

wherein $x$ is 1 and $n$, R and R' have the same meaning as previously described, can then be obtained by first extracting the residual oil with a suitable solvent such as benzene, cyclohexane, heptane, carbon tetrachloride etc. to give a viscous liquid which on distillation yields as the overhead product monomeric materials of Formula A (where $x$ is 1) and as the bottoms product polymeric materials of Formula A (where $x$ is greater than 1).

Ortho carborane (i.e., o-carborane) compounds useful ultimately in preparing the di(alkali metal)-m-carboranes which, in turn, are utilized as starting materials in the method of this invention can be prepared by the reaction of decaborane or an alkylated decaborane having an alkyl group containing 1 to 5 carbon atoms, with acetylene in the presence of a wide variety of ethers, amines or nitriles. The preparation of these compounds is described in application Ser. No. 741,976, filed June 13, 1958 now abandoned of Ager, Heying and Mangold. For example, the compound o-carborane having the formula:

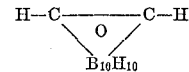

can be prepared by reacting for about 12 hours at 125° C. a mixture of decaborane and tetrahydrofuran in an autoclave pressured to 100 p.s.i. with acetylene.

When o-carboranes of the formula:

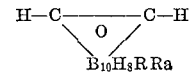

wherein R and Ra are each selected from the group consisting of hydrogen and alkyl of from 1 to 5 carbon atoms, are heated to a temperature above 400° C., a thermal isomerization takes place and the so-called meta- or m-carboranes are formed. For example, the compound o-carborane which has the formula:

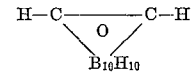

can be converted to m-carborane, that is, $HCB_{10}H_{10}CH$, by heating at a temperature of 475° C. for 5 to 20 hours. Halogenated m-carborane compounds can be formed by the methods set forth in Heying and Schroeder application Ser. No. 414,947, filed Nov. 27, 1964 now U.S. 3,562,-324 and in Schroeder and Smith application Ser. No. 379,-859, filed July 2, 1964 now abandoned. For example, B-tetrachloro-m-carborane can be prepared by reacting gaseous chlorine with m-carborane in carbon tetrachloride and under ultraviolet irradiation.

The di(alkali metal)-m-carborane compounds which are useful as starting materials in the process of this invention can be prepared by the process described in U.S. Patent 3,148,219 and have the formula:

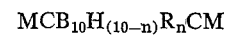

wherein $n$ is an integer of from 0 to 10, M is an alkali metal selected from the group consisting of sodium, lithium, and potassium, R is selected from the group consisting of alkyl of from 1 to 5 carbon atoms and halogen selected from the group consisting of chlorine, bromine, iodine, and fluorine, and with the proviso that when R is alkyl, then $n$ is 1. For example, C,C'-dilithio-m-carborane can be formed by reacting m-carborane with n-butyl lithium in the presence of dialkyl ether. Suitable di(alkali metal)-m-carboranes include C,C'-dilithio-B-methyl-m-carborane, C,C'-dilithio-B-isopropyl-m-carborane, C,C'-dilithio-B-amyl-m-carborane, C,C'-dilithio-B-chloro-m-carborane, C,C'-dilithio-B-fluoro-m-carborane, C,C'-dilithio-B-tetrachloro-m-carborane, C,C' - dilithio-B-iodo-m-carborane, C,C'-dilithio-B-dibromo-m-carborane, C,C'-dilithio-B-heptafluoro-m-carborane, C,C' - dilithio-B-decachloro-m-carborane, etc., and the corresponding sodium and potassium compounds.

Phosphine compounds suitable as starting materials in the method of this invention include phosphorus trichloride, phenyldichlorophosphine, dimethylphenyldichlorophosphine, ethylphenyldichlorophosphine, n-propylphenyldichlorophosphine, isopropylphenyldichlorophosphine, etc.

Treatment of the novel chlorine-terminated m-carborane derivatives of this invention at a temperature of from about 0° to about 80° C. with a monohydric alcohol of the formula:

$$R''OH$$

wherein R'' is alkyl of from 1 to 10 carbon atoms, results in the formation of alkoxy-substituted materials of the formula:

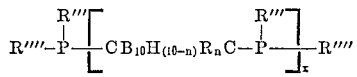

wherein $x$ is an integer of from 1 to about 10, $n$ is an integer of from 0 to 10 inclusive, R is selected from the group consisting of alkyl of from 1 to 5 carbon atoms and halogen selected from the group consisting of chlorine, bromine, iodine and fluorine, each R''' is independently selected from the group consisting of chlorine, phenyl, and alkyl-substituted phenyl of not more than 10 carbon atoms, and R''OH, wherein R'' is alkyl of from 1 to 10 carbon atoms and each R'''' is independently selected from the group consisting of chlorine and R''O—, wherein R'' is alkyl of from 1 to 10 carbon atoms, and with the proviso that when R is alkyl, then $n$ is 1, that when R''' is phenyl or alkyl-substituted phenyl, both R''' substituents are the same and that at least one of R''' and R'''' is R''O—. Generally, from about 5 to about 150 moles or more of the monohydric alcohol will be reacted per mole of the starting chlorine-terminated compound of Formula A. Useful alcohols include methyl alcohol, ethyl alcohol, n-propyl alcohol, isopropyl alcohol, n-butyl alcohol, sec.-n-butyl alcohol, amyl alcohol, isooctyl alcohol, n-nonyl alcohol, n-decyl alcohol, etc. and mixtures of these alcohols. Recovery of the alkoxylated compounds is accomplished by evaporating off the alcohol or by any other convenient method.

All of the solid products of this invention (i.e., both monomers and polymers) can be utilized as flame retardants in plastics, such as polyethylene, polypropylene, polyvinyl chloride, etc. For example, from about 2 to about 15 percent by weight of the polymer formed in Example I can be blended with polyethylene or with polyethylene and about 5 percent by weight of paraffin wax to yield products with highly improved flame resistance properties. Any suitable process can be used for preparing the blends such, for example, as Banbury mixers, extrusion mixers, roll mills or solution blending processes well known in the art. The ultimate products can be formed from such blends by solution casting, extrusion molding, pressure molding and the like. Form supported or unsupported films, rods or other shapes can be prepared.

The liquid products of this invention, such as the product of Example III (i.e., m—$B_{10}H_{10}C_2(C_6H_5 \cdot P \cdot Cl)_2$) can be blended with waxes such as petroleum wax or chlorinated paraffin by heating the two materials together at a temperature above the melting point of the wax. Such blended products, which generally contain from about 80 to about 95 percent by weight of the wax, can be utilized to prepare coated paper, film etc., having a high degree of flame retardance. Coated products can also be prepared by spraying the liquid products of this invention on plastic film or sheet.

In addition, the liquid products of this invention can be used in the manufacture of non-flammable urethane foams. For example, from about 1 to about 5 percent or more of the compound:

can be mixed with tolylene diisocyanate, oxyethylated glycerin of molecular weight 3000; a catalyst such as dibutyl tin dilaurate; a cross-linking agent such as N,N,N', N'-tetrakis (2)hydroxypropyl) ethylene diamine and foamed in the presence of a blowing agent such as trichlorotrifluoroethane, to yield a polyurethane product exhibiting excellent non-burning properties.

The examples which follow illustrate various embodiments of this invention and are to be considered not limitative:

EXAMPLE I

Dilithio-m-carborane (i.e., $LiCB_{10}H_{10}CLi$) (0.42 mole) slurried in ether (1000 ml.) was added, with stirring and ice-cooling to a solution of $PCl_3$ (173 g., 1.26 mole) in ether (2000 ml.) over a 20 min. period. After stirring for 12 hr. at ambient temperature, the solvent was removed in vacuo. The residual oil was extracted with 300 ml. benzene to give, after evaporation of the benzene, a viscous liquid which was subjected to vacuum distillation. Yield of the compound of the formula:

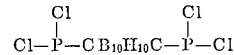

was 59 g. (40 percent); B.P. 119° C. (0.3 mm.); $n_D^{22}$: 1.618.3.

*Analysis.*—Calcd. for $C_2H_{10}B_{10}Cl_4P_2$ (346.1) (percent): C, 6.94; H, 2.91; B, 31.27; C, 40.98; P, 17.90. Found (percent): C, 6.66; H, 2.90; B, 31.27; C, 40.20; P, 17.50.

The distillation residue was triturated with cold methanol to give 30 g. (about 35 percent based on m-carborane starting material) of solid polymeric product, M.P. 120–35° C.

*Analysis.*—Calcd. for $C_{11}H_{53}B_{50}Cl_7OP_6$ (percent): C, 11.23; H, 4.54; B, 45.98; C, 21.09; P, 15.80. Found (percent): C, 11.25; H, 4.58; B, 48.81; C, 22.20; P, 15.47. Mol. weight (in toluene at 39° C.): 1117.

Based on the molecular weight and elemental analysis it was determined that the formula of the polymer was:

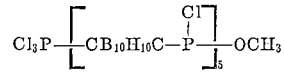

EXAMPLE II

The procedure as described in Example I above was repeated except that 58 g. (0.42 mole) of $PCl_3$ in 1000 ml. of ether was employed. The yield of the compound:

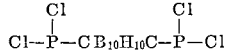

recovered as the overhead product on distillation was 19 g. (13 percent based on the m-carborane starting material). From the residue after treatment with methanol there was obtained 58 g. (about 57 percent) of polymeric product (mol. weight 1088) of the formula:

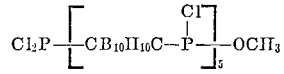

EXAMPLE III

A dilithio-m-carborane (0.1 mole) solution in ether (400 ml.) was added to phenyldichlorophosphine (35.8 g., 0.2 mole) in ether (500 ml.) and allowed to react at a temperature of 10–15° C. The mixture was refluxed for 1 hour, cooled to 20° C. and filtered after which the solvent was stripped off. The crude product was distilled in vacuo to give 25 g. (58.3 percent) of $(C_6H_5 \cdot P \cdot Cl)CB_{10}H_{10}C(C_6H_5 \cdot P \cdot Cl)$ having the formula:

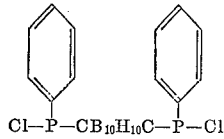

$Cl-P-CB_{10}H_{10}C-P-Cl$

B.P. 220° C. (0.35 mm.); $n_D^{26}$: 1.652.2.

*Analysis.*—Calcd. for $C_{14}H_{20}B_{10}Cl_2P_2$ (429.4) (percent): C, 39.16; H, 4.70; B, 25.20; Cl, 16.51; P, 14.43. Found (percent): C, 38.70; H, 4.80; B, 25.23; Cl, 16.50; P, 14.25.

EXAMPLE IV

Thirty grams of $(C_6H_5 \cdot P \cdot Cl)CB_{10}H_{10}C(C_6H_5 \cdot P \cdot Cl)$, prepared as described in Example III, was dissolved in 300 ml. of methanol.

After stirring at ambient temperature for 2 hours, the reaction product had precipitated and was recovered by filtration. Recrystallization from methanol afforded 22.1 g. (75 percent) of pure product of the formula:

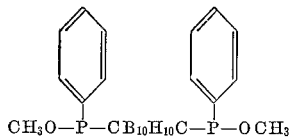

$CH_3O-P-CB_{10}H_{10}C-P-OCH_3$

M.P. 112–14° C.

*Analysis.*—Calcd. for $C_{16}H_{26}B_{10}O_2P_2$ (420.5) (percent): C, 45.70; H, 6.23; B, 25.73; P, 14.73. Found (percent): C, 45.82; H, 5.95; B, 25.56; P, 14.17.

EXAMPLE V

An amount of 5 g. of $Cl_2PCB_{10}H_{10}CPCl_2$ prepared as described in Example I was dissolved in 50 ml. of methanol. After removal of the solvent, there remained a colorless liquid m-carborane derivative, free of chlorine, having the formula:

$$\begin{array}{cc} CH_3O & OCH_3 \\ | & | \\ CH_3O-P-CB_{10}H_{10}C-P-OCH_3 \end{array}$$

$n_D^{26}$: 1.5420.

*Analysis.*—Calcd. for $C_6H_{22}B_{10}O_4P_2$ (328.4) (percent): C, 21.95; H, 6.75; B, 32.95; P, 18.18. Found (percent): C, 20.55; H, 6.51; B, 33.44; P, 18.08.

EXAMPLE VI

A solution of m-$B_{10}H_9BrC_2H_2$ (i.e., $HCB_{10}H_9BrCH$) (22.3 g., 0.1 mole) in ether (100 ml.) was added, with stirring and ice-cooling, to a solution of butyl lithium (0.25 mole) in hexane (170 ml.) and ether (100 ml.). The reaction mixture was stirred at 0° for 1 hour, then filtered. The insoluble dilithium m-carborane salt, having the formula:

$LiCB_{10}H_9BrCLi$ was washed with ether, then slurried with 250 ml. ether, and added with ice-cooling to a solution of $PCl_3$ (41.1 g., 0.3 mole) in 500 ml. ether. After stirring for 12 hours at ambient temperature, the resulting mixture was filtered, and then the filtrate evaporated to dryness. Trituration of the residue with methanol afforded 25 g. of polymer of the formula:

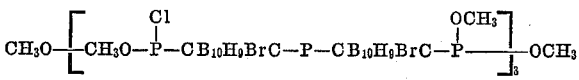

$$\left[ CH_3O-\underset{|}{\overset{Cl}{CH_3O-P}}-CB_{10}H_9BrC-P-CB_{10}H_9BrC-\underset{|}{\overset{OCH_3}{P}}-OCH_3 \right]_3$$

M.P. 115–120° C.

*Analysis.*—Calcd. for $C_{15}H_{63}B_{60}Br_6Cl_3O_3P_6$ (1712.1) (percent): C, 10.52; H, 3.71; B, 37.91; Cl, 6.21; Br, 28.00; P, 10.85. Found (percent): C, 9.67; H, 3.68, B, 36.34; Cl, 6.21; Br, 28.00; P, 11.08. Mol. weight (in toluene at 39° C.): 1784.

What is claimed is:

1. An m-carborane compound of the formula:

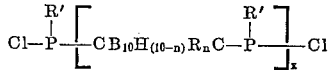

$$Cl-\underset{|}{\overset{R'}{P}}-\left[CB_{10}H_{(10-n)}R_nC-\underset{|}{\overset{R'}{P}}\right]_x-Cl$$

wherein x is an integer of from 2 to about 10, n is an integer of from 0 to 10 inclusive, R is a halogen selected from the group consisting of chlorine, bromine, iodine and fluorine, R' is selected from the group consisting of chlorine, phenyl, and alkyl-substituted phenyl of not more than 10 carbon atoms.

2. The compound of claim 1 wherein x is 5, n is 0 and R' is Cl.

3. A method for the preparation of an m-carborane compound of the formula:

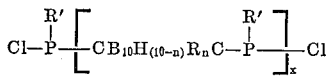

$$Cl-\underset{|}{\overset{R'}{P}}-\left[CB_{10}H_{(10-n)}R_nC-\underset{|}{\overset{R'}{P}}\right]_x-Cl$$

wherein x is an integer of from 2 to about 10, n is an integer of from 0 to 10 inclusive, R is a halogen selected from the group consisting of chlorine, bromine, iodine and fluorine, and R' is selected from the group consisting of chlorine, phenyl, and alkyl-substituted phenyl of not more than 10 carbon atoms which comprises reacting a phosphine of the formula:

$$\underset{|}{\overset{Cl}{R'-P-Cl}}$$

wherein R' has the same meaning as previously described, with an m-carborane compound of the formula:

$MCB_{10}H_{(10-n)}R_nCM$ wherein M is an alkali metal selected from the group consisting of sodium, lithium and potassium and n and R have the same meaning as previously described.

4. The method of claim 3 wherein the reaction is conducted at a temperature range of from about −10° to about +60° C.

5. The method of claim 3 wherein the acid reaction is conducted in the presence of an inert organic solvent.

6. The method of claim 5 wherein the said solvent is diethyl ether.

7. The method of claim 3 wherein the said phosphine is phenyldichlorophosphine.

8. The method of claim 3 wherein the said phosphine is phosphorus trichloride.

9. The method of claim 3 wherein the said m-carborane compound is:

$LiCB_{10}H_{10}CLi$

10. The method of claim 3 wherein from about 1 to about 10 moles of the said phosphine are reacted with each mole of the said m-carborane compound.

References Cited

Alexander et al. J. Inorganic Chemistry vol. 2 No. 6 (December 1963) pp. 1107–1110.

JAMES A. PATTEN, Primary Examiner

E. J. GLEIMAN, Assistant Examiner

U.S. Cl. X.R.

204—158 HA